US006152478A

United States Patent [19]

Hung

[11] Patent Number: 6,152,478

[45] Date of Patent: Nov. 28, 2000

[54] WHEELCHAIR WITH A PIVOTING BACK, SEAT AND LEG SUPPORTS

[76] Inventor: Chin-Lien Hung, No. 21, Lane 151, Ho-Tso St., Fengyuan City, Taichung Hsien, Taiwan

[21] Appl. No.: 09/320,592

[22] Filed: May 27, 1999

[51] Int. Cl.$^7$ ........................................................ B62B 1/00

[52] U.S. Cl. .................................... 280/650; 297/DIG. 4; 297/DIG. 10; 297/330; 403/83

[58] Field of Search ............................ 280/650; 180/907; 297/DIG. 4, DIG. 10, 354.13, 362.11, 330; 414/921; 403/220, 83

[56] References Cited

U.S. PATENT DOCUMENTS

| | | | |
|---|---|---|---|
| 4,809,804 | 3/1989 | Houston et al. | 180/65.5 |
| 5,094,310 | 3/1992 | Richey et al. | 180/65.5 |
| 5,096,008 | 3/1992 | Mankowski | 180/6.5 |
| 5,366,036 | 11/1994 | Perry | 180/65.1 |

FOREIGN PATENT DOCUMENTS

| | | | |
|---|---|---|---|
| 0776610 | 11/1980 | U.S.S.R. | 180/907 |
| 2125285 | 3/1984 | United Kingdom | 297/DIG. 4 |

*Primary Examiner*—Brian L. Johnson
*Assistant Examiner*—G B Klebe
*Attorney, Agent, or Firm*—Jackson Walker L.L.P.

[57] ABSTRACT

A wheelchair includes a base with two pairs of wheels connected to two sides of the base. A seat is connected to the base and a backrest is connected to the rear end of the seat. A seat shaft is located below the seat and a backrest supports the backrest. Two identical transmitting systems are connected between the seat shaft and the backrest shaft, wherein the seat shaft is driven by a motor. Each of the seat shaft and the backrest shaft has a rotatable member and a fixed member co-axially mounted to one of two ends thereof. A connecting tube is connected between the rotatable member on the seat shaft and the fixed member on the backrest shaft. Each of the rotatable member and the fixed member has arciform slots defined therein so that a chain is engaged with the arciform slots and passing through the connecting tube. The seat can be pivoted to an upright position to assist the disable person to stand up by rotating the rotatable members.

7 Claims, 16 Drawing Sheets

WHEELCHAIR WITH A PIVOTING BACK, SEAT AND LEG SUPPORTS

FIELD OF THE INVENTION

The present invention relates to a wheelchair, and more particularly, to an electric wheelchair wherein the seat, the backrest and the leg supports of the wheelchair can be pivoted to assist a disabled person in standing up from or lying down on the wheelchair.

BACKGROUND OF THE INVENTION

A conventional electric wheelchair includes a motor to drive the wheels so that a disabled person sitting in the wheelchair may move the wheelchair by manipulating a controller to control the turning directions of the wheels. Although the conventional electric wheelchair is helpful for the disabled persons, the seat, the backrest and leg supports of the wheelchair are fixed and their positions cannot be changed without manual intervention. Therefore, when the disabled person wants to stand up, others must assist the disabled person.

The present invention intends to provide an electric wheelchair wherein the seat, the backrest and the leg supports can be operated and pivoted by means of the controller to assist the disabled person in standing up from or lying down on the wheelchair.

SUMMARY OF THE INVENTION

The object of the present invention is to provide a wheelchair that uses a motor to drive two identical transmitting systems to pivot the seat, the backrest and the leg supports to an upright position or a horizontal position so as to assist a disable person sitting in the wheelchair to stand up from or to lay on the wheelchair.

Further objects, advantages, and features of the present invention will become apparent from the following detailed description with appropriate reference to the accompanying drawings.

DFTAILED DESCRIPTION OF THE PREFERRED EMBODIMENTS

Figure 1:
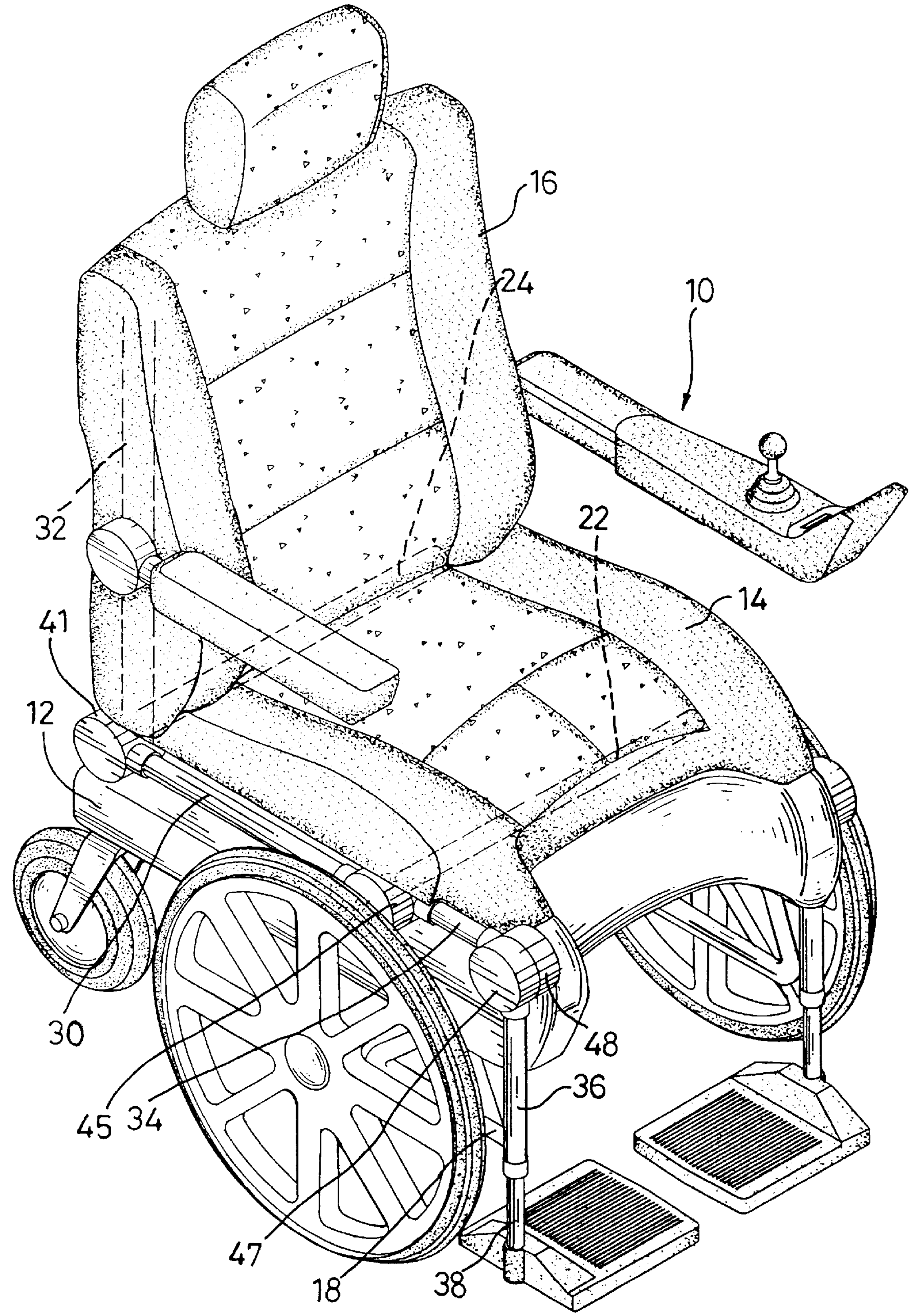
FIG. 1 is a perspective view of the wheelchair in accordance with the present invention.
Figure 2:
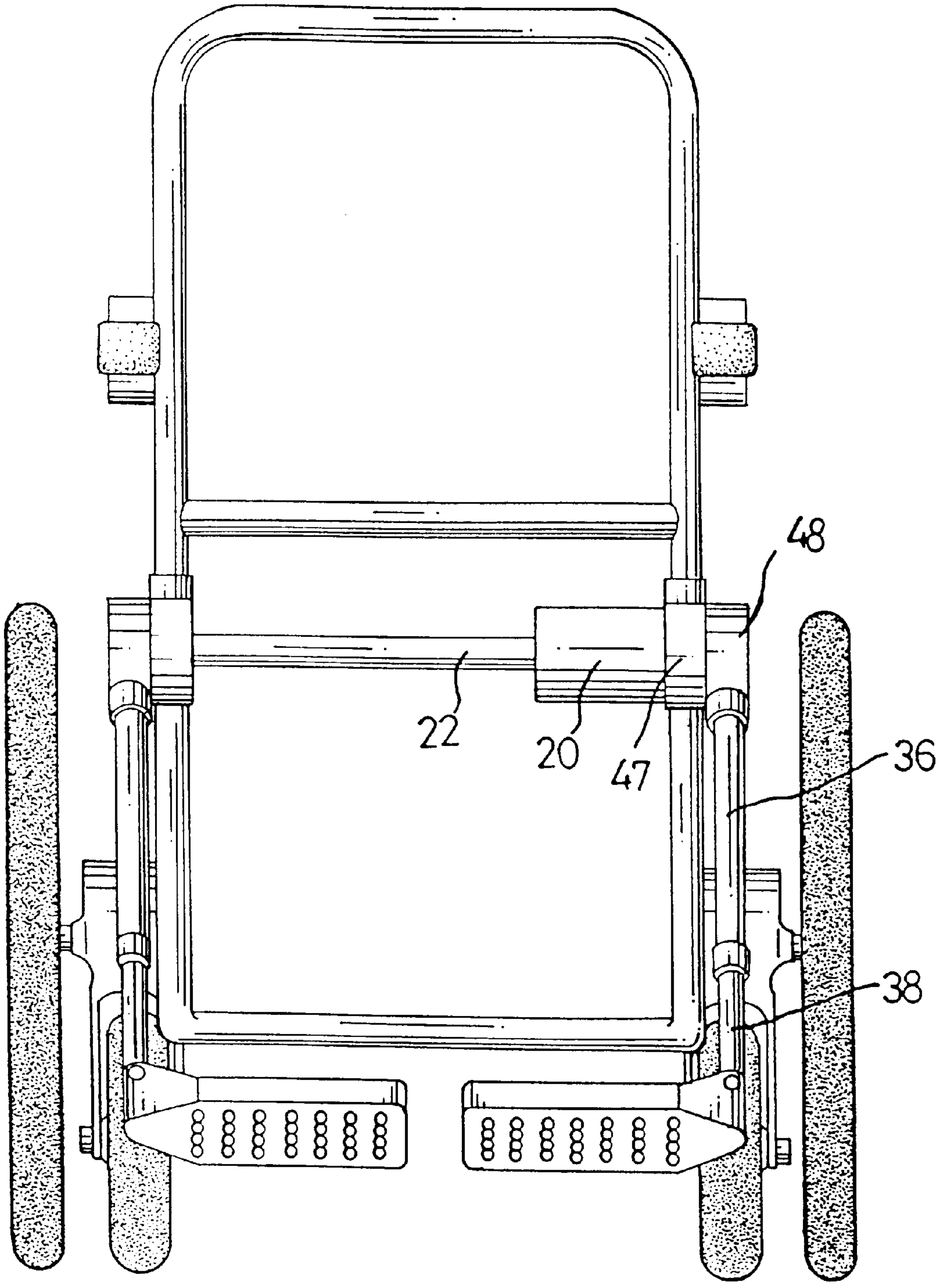
FIG. 2 is a front plan view of the wheelchair frame in accordance with the present invention.

FIG. 1 shows the electric wheelchair (10) in accordance with the present invention and includes a base (12) and two pairs of wheels connected to the two sides of the base (12). A seat (14) is connected to the top of the base (12) and a backrest (16) is connected to the rear end of the seat (14). An identical transmitting system is connected to each side of the base (12), and the two transmitting systems control the seat (14) and the backrest (16). The two transmitting systems are connected by a backrest shaft (24) and a seat shaft (22). As shown in FIG. 2, the seat shaft (22) is driven by a motor (20) located below the seat (14). The backrest shaft (24) is located below the lower end of the backrest (16), and the backrest (16) is supported by two backrest rods (32).

Figure 3:
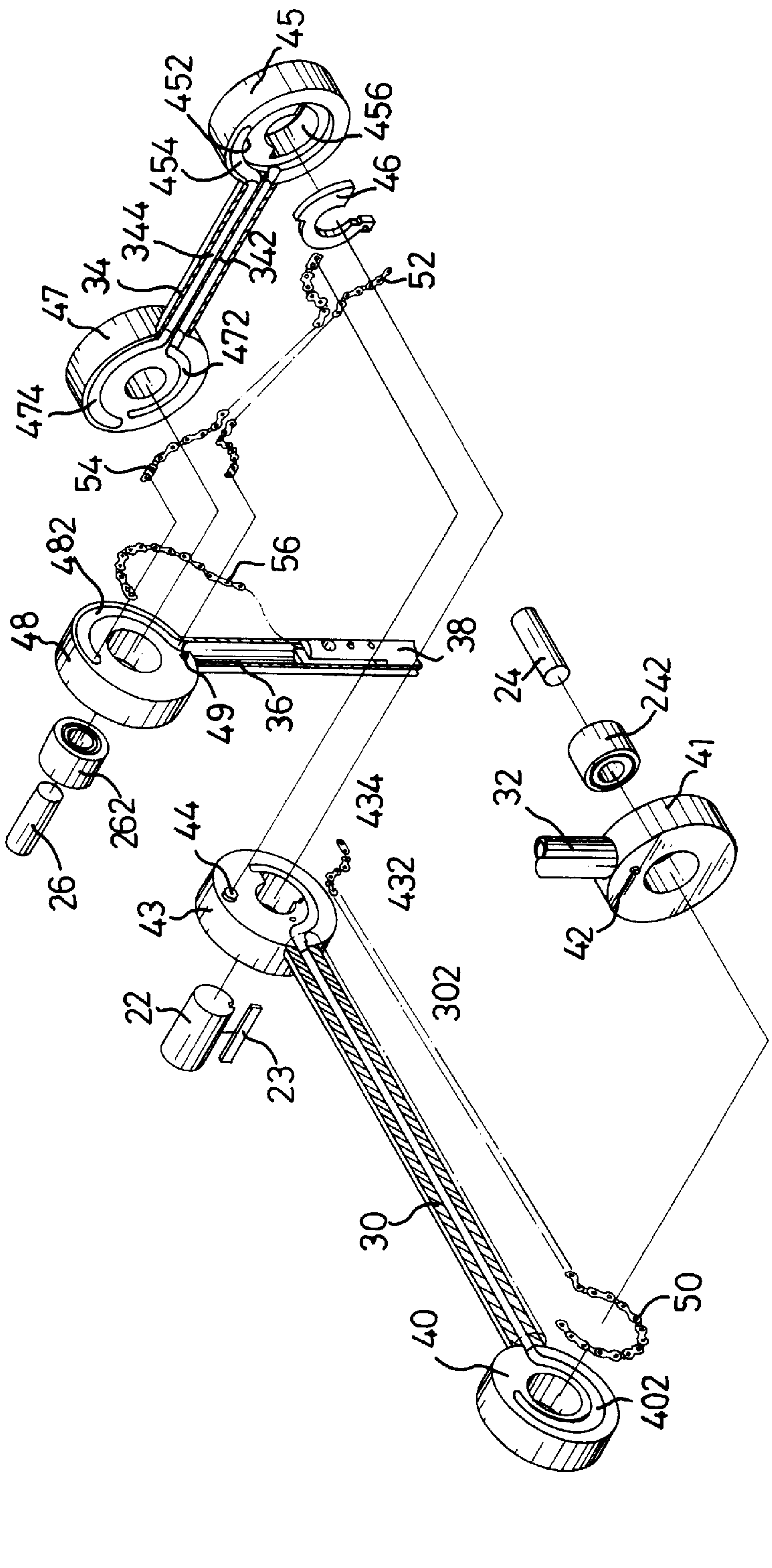
FIG. 3 is an exploded perspective view of one of the transmitting systems of the wheelchair in accordance with the present invention.
Figure 4:
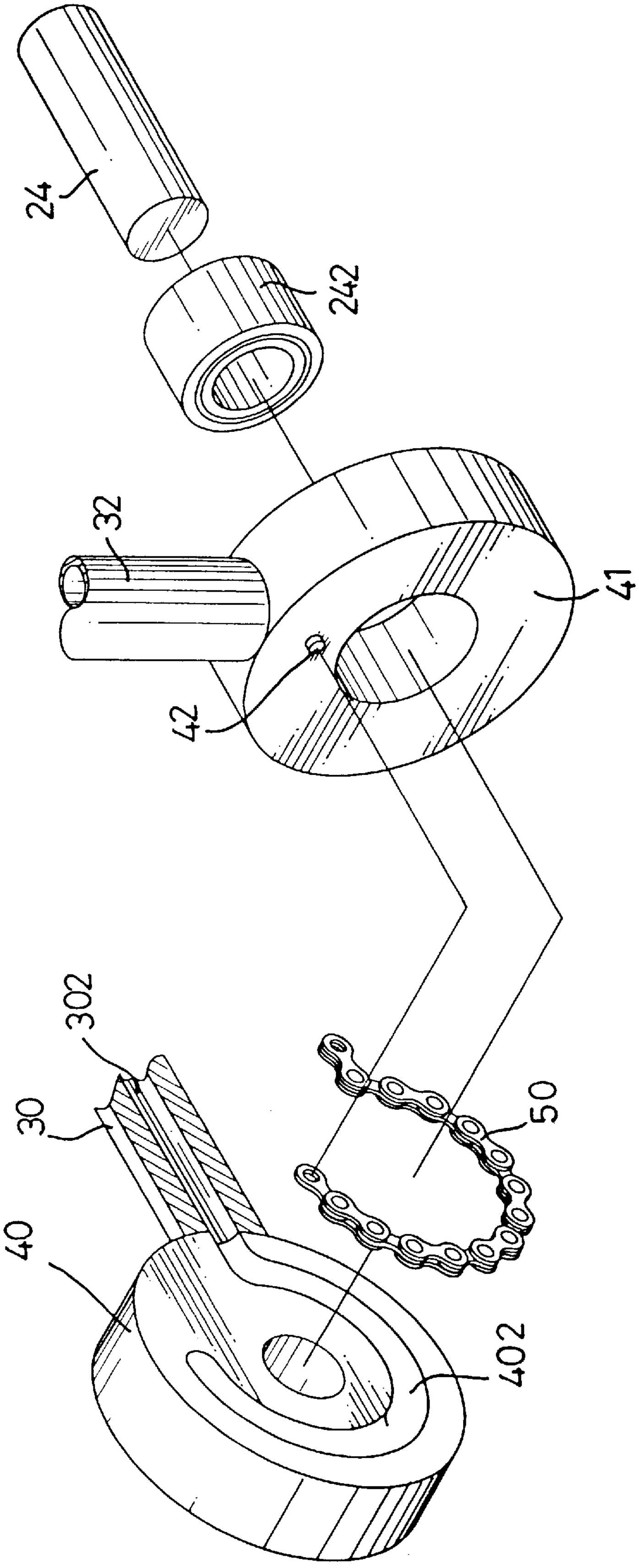
FIG. 4 is an exploded perspective view of the first fixed member, the first chain and the second rotatable member in accordance with the present invention.
Figure 5:
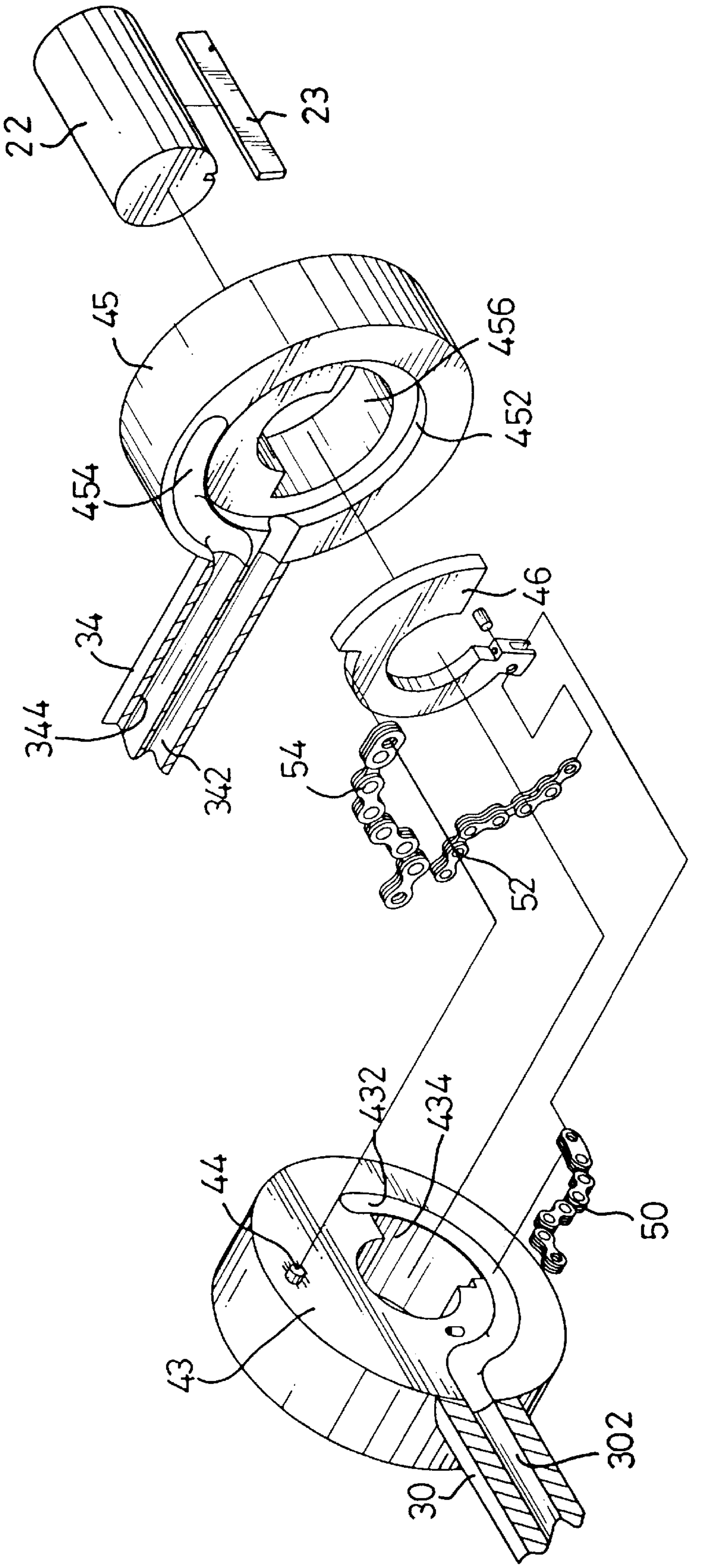
FIG. 5 is an exploded perspective view of the first rotatable member, the second chain, the third chain and the second fixed member in accordance with the present invention.

Referring to FIGS. 3 and 5, taking one of the transmitting systems as an example, each of the two ends of the seat shaft (22) has a first rotatable member (43) 5 connected thereto, and a key (23) fixedly connected to the seat shaft (22) is disengagably connected to the first rotatable member (43). The first rotatable member (43) has a sector-shaped first opening (434) having a center angle of 90 degrees defined therethrough, and the key (23) is disengagably engaged with the inside of the fan-shaped first opening (434). Referring to FIG. 4, each of two ends of the backrest shaft (24) has a first fixed member (40) connected thereto and a first connecting tube (30) connected between the first rotatable member (43) and the first fixed member (40). A first passage (302) is defined longitudinally through the first connecting tube (30). Each first rotatable member (43) has a second fixed member (45) co-axially mounted thereto, and each first fixed member (40) has a second rotatable member (41) co-axially mounted thereto. A bearing (242) is connected between the backrest shaft (24) and the second rotatable member (41).

Figure 8:
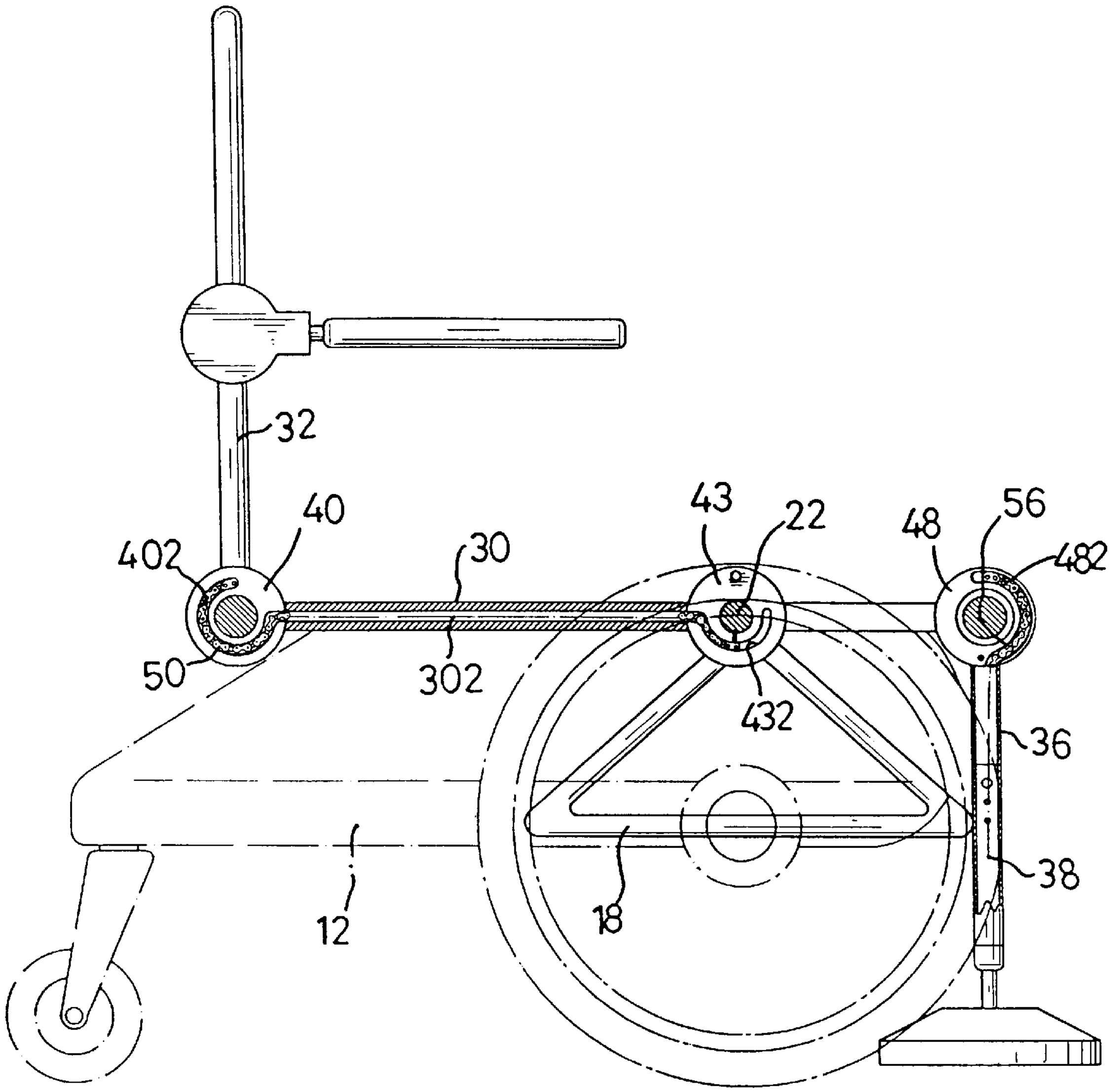
FIG. 8 is a side elevational view, partly in section, of the first chain between the first rotatable member and the first fixed member, and the fourth chain in the third rotatable member of the wheelchair in accordance with the present invention.

The first fixed member (40) has a first arciform slot (402) in the side facing the second rotatable member (41), wherein the first arciform slot (402) extends through a center angle of at least 270 degrees. The first rotatable member (43) has a second arciform slot (432) defined in the side facing the second fixed member (45), wherein the second arciform slot (432) extends through center angle of at least 180 degrees. Each of the first arciform slot (402) and the second arciform slot (432) communicates with the first passage (302) so that a first chain (50) extends through the first passage (302) and has the first end thereof received in the first arciform slot (402) and the second end of the first chain (50) is received in the second arciform slot (432). As shown in FIG. 8, the first end of the first chain (50) extends to the end of the first arciform slot (402) and the second end of the first chain (50) is located at the 90 degree position in the second arciform slot (432). The first end of the first chain (50) is fixedly connected to a protrusion (42) on the second rotatable member (41).

The second fixed member (45) has a second opening (456) with a center angle of 180 degrees so that the seat shaft (22) and the key (23) are rotatable in the second opening (456). The second fixed member (45) has a third arciform slot (452) defined in the side facing the first rotatable member (43) and the third arciform slot (452) communicates with the second opening (456). A C-shaped member (46) is rotatable in the third arciform slot (452) and the second end of the first chain (50) in the second arciform slot (432) is attached to the C-shaped member (46). The key (23) is disengagably connected to the C-shaped member (46) so that the C-shaped member (46) can move within the third arciform slot (452) when the seat shaft (22) rotates. The second fixed member (45) has a fourth arciform slot (454) defined in the side facing the first rotatable member (43). The fourth arciform slot (454) has a center angle of 90 degrees. A second connecting tube (34) extends from the second fixed member (45) and a second passage (342) and a third passage (344) are respectively and longitudinally defined through the second connecting tube (34). A third fixed member (47) is connected to the other end of the second connecting tube (34), as shown in FIGS. 6, 8 and 9, the third fixed member (47) has a fifth arciform slot (472) and a sixth arciform slot (474) respectively defined in a side thereof The second passage (342) communicates with the third arciform slot (452) and the fifth arciform slot (472) which has a center angle of 180 degrees, and the third passage (344) communicates with the fourth arciform slot (454) and the sixth arciform slot (474) which has a center angle of 180 degrees.

Figure 9:
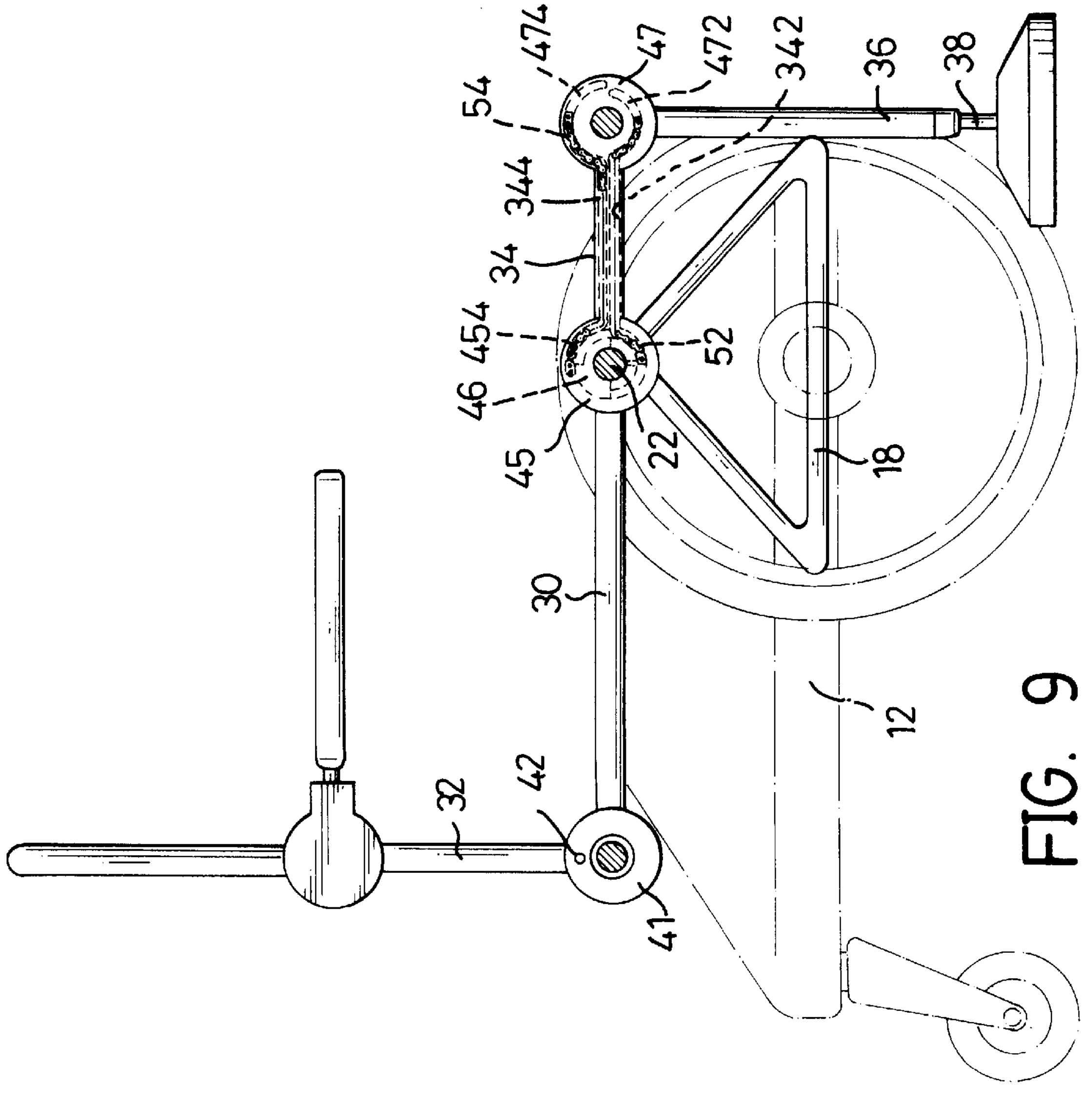
FIG. 9 is a side elevational view, partly in section, of the second and the third chain between the second fixed member and the third fixed member of the wheelchair in accordance with the present invention.
Figure 11:
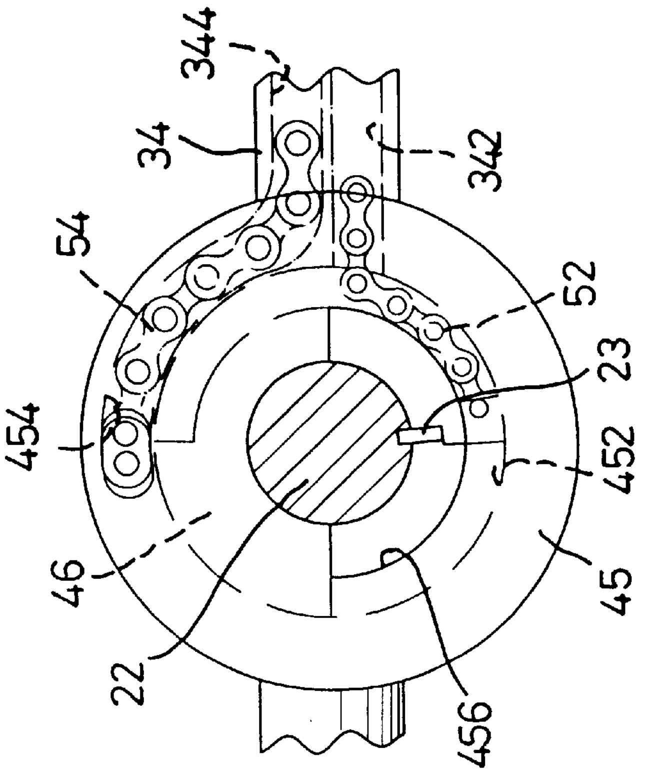
FIG. 11 is a side plan view of the second and the third chain in the second fixed member in accordance with the present invention.
Figure 10:
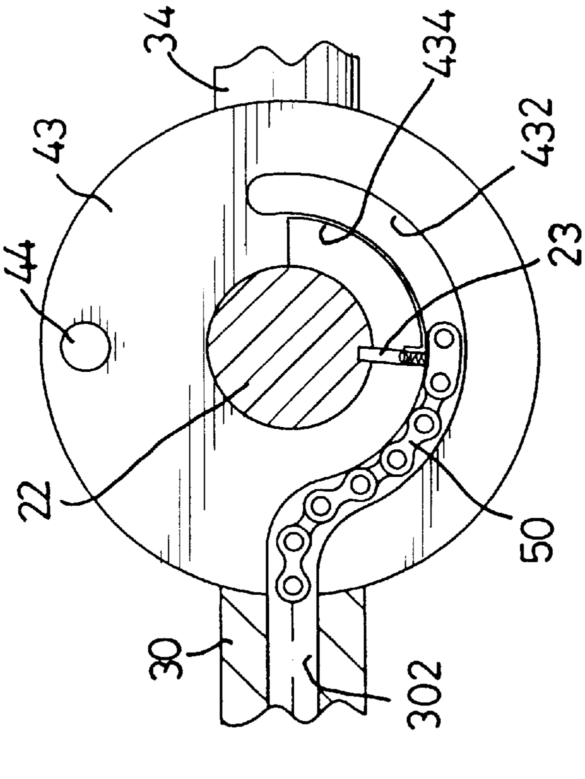
FIG. 10 is a side plan view of the first chain in the second arciform slot and the key engaged with the first rotatable member in accordance with the present invention.

A second chain (52) is attached to the C-shaped member (46), as shown in FIGS. 3, 5, 6, 8 and 9, extends through the second passage (342) and extends into the fifth arciform slot (472) in the third fixed member (47). The two ends of the second chain (52) are located at the 90 degree position in the third arciform slot (452) and the fifth arciform slot (472), as shown in FIGS. 9 and 10. A third chain (54) has one end attached to a protrusion (44) on the first rotatable member (43) and the other end of the third chain (54) extends through the fourth arciform slot (454) and the third passage (344) and is located in the sixth arciform slot (474) in the third fixed member (47). The two ends of the third chain (54) are located at the 90 degree position in the fourth arciform slot (454) and the sixth arciform slot (474).

Figure 6:
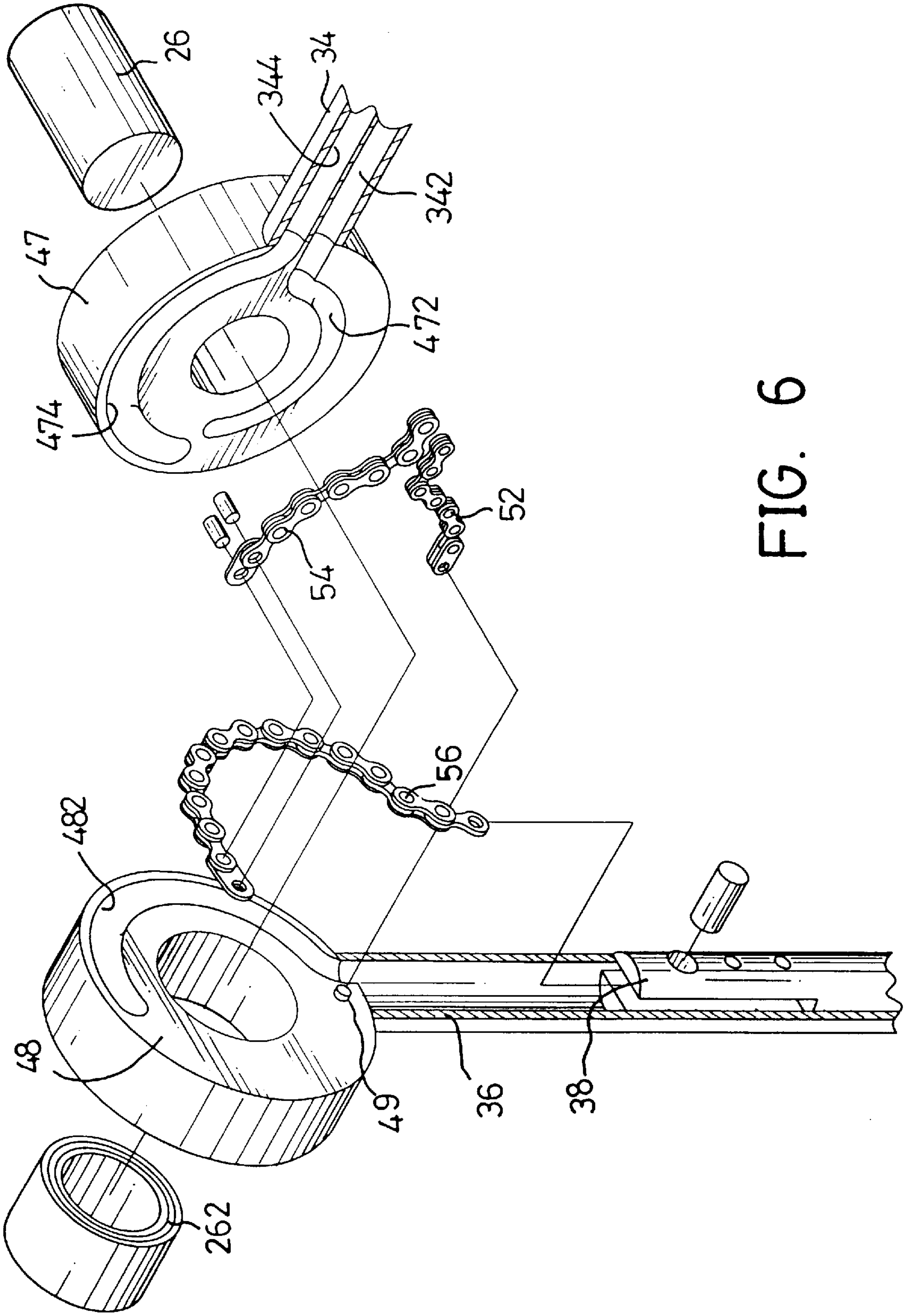
FIG. 6 is an exploded perspective view of the third fixed member, the second chain, the third chain, the fourth chain and the third rotatable member in accordance with the present invention.

Referring to FIGS. 2, 6 and 8, the third fixed member (47) is mounted to a knee shaft (26) and a third rotatable member (48) is co-axially connected to the third fixed member (47). A bearing (262) is connected between the third rotatable member (48) and the knee shaft (26) so that the third rotatable member (48) is rotatable about the knee shaft (26). The third rotatable member (48) is connected to a downward support tube (36) that has an inner rod (38) retractably received in the support tube (36).

The third rotatable member (48) has a seventh arciform slot (482) defined in the side facing the third fixed member (47), and the seventh arciform slot (482) extends about 180 degrees. The seventh arciform slot (482) communicates with the interior of the support tube (36), and a fourth chain (56) has one end in the seventh arciform slot (482) connected to the third chain (54) in the sixth arciform slot (474), and the other end of the fourth chain (56) is connected to the inner rod (38). The third rotatable member (48) has a protrusion (49) which is connected to the second chain (52) in the fifth arciform slot (472) of the sixth fixed member (47). As shown in FIG. 1, a truss (18) is located below the base (12) and contacts the support tube (36).

Figure 12:
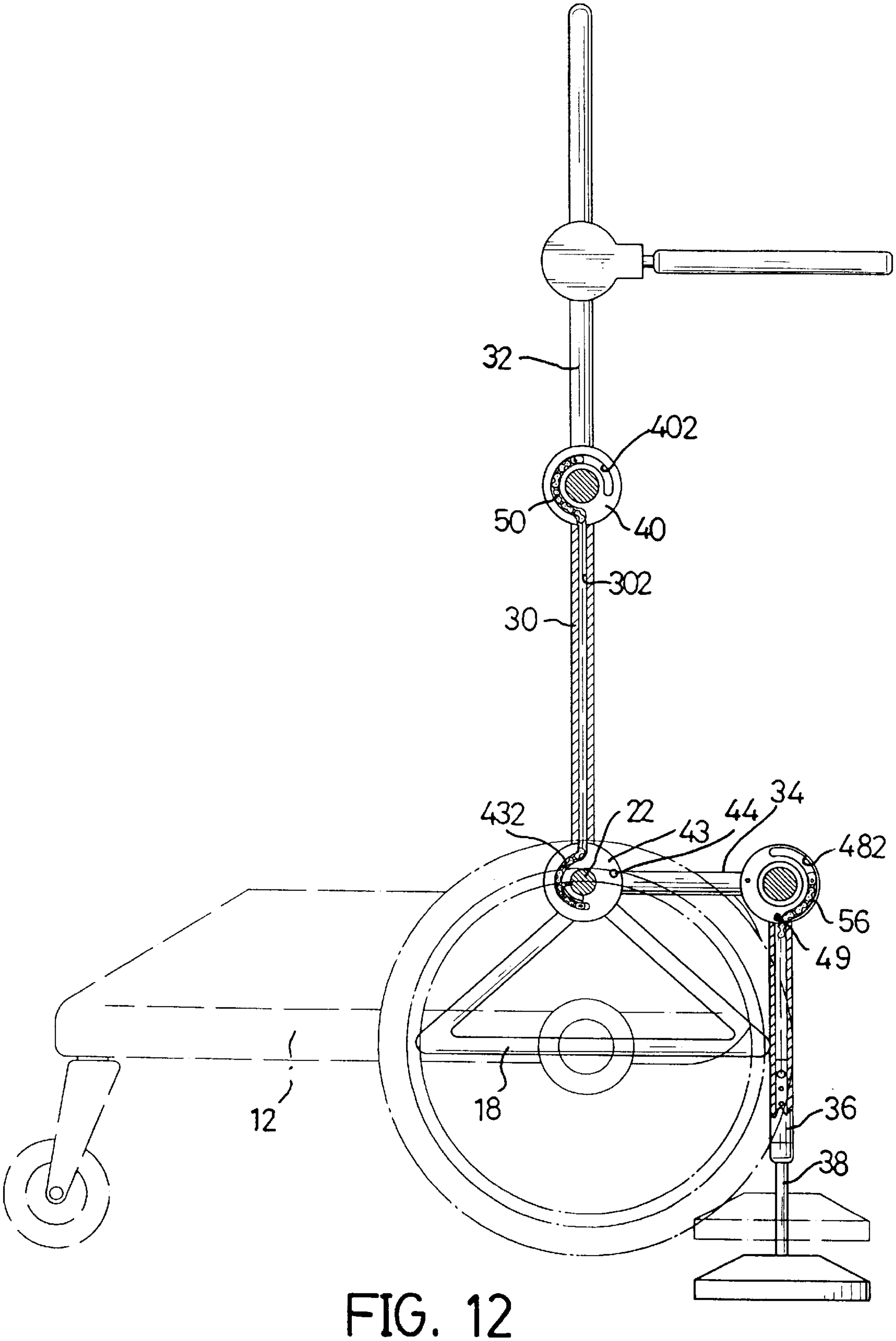
FIG. 12 is a side plan view of the backrest and the seat pivoted to an upright position and the chains in the first connecting tube and the second connecting tube in accordance with the present invention.
Figure 13:
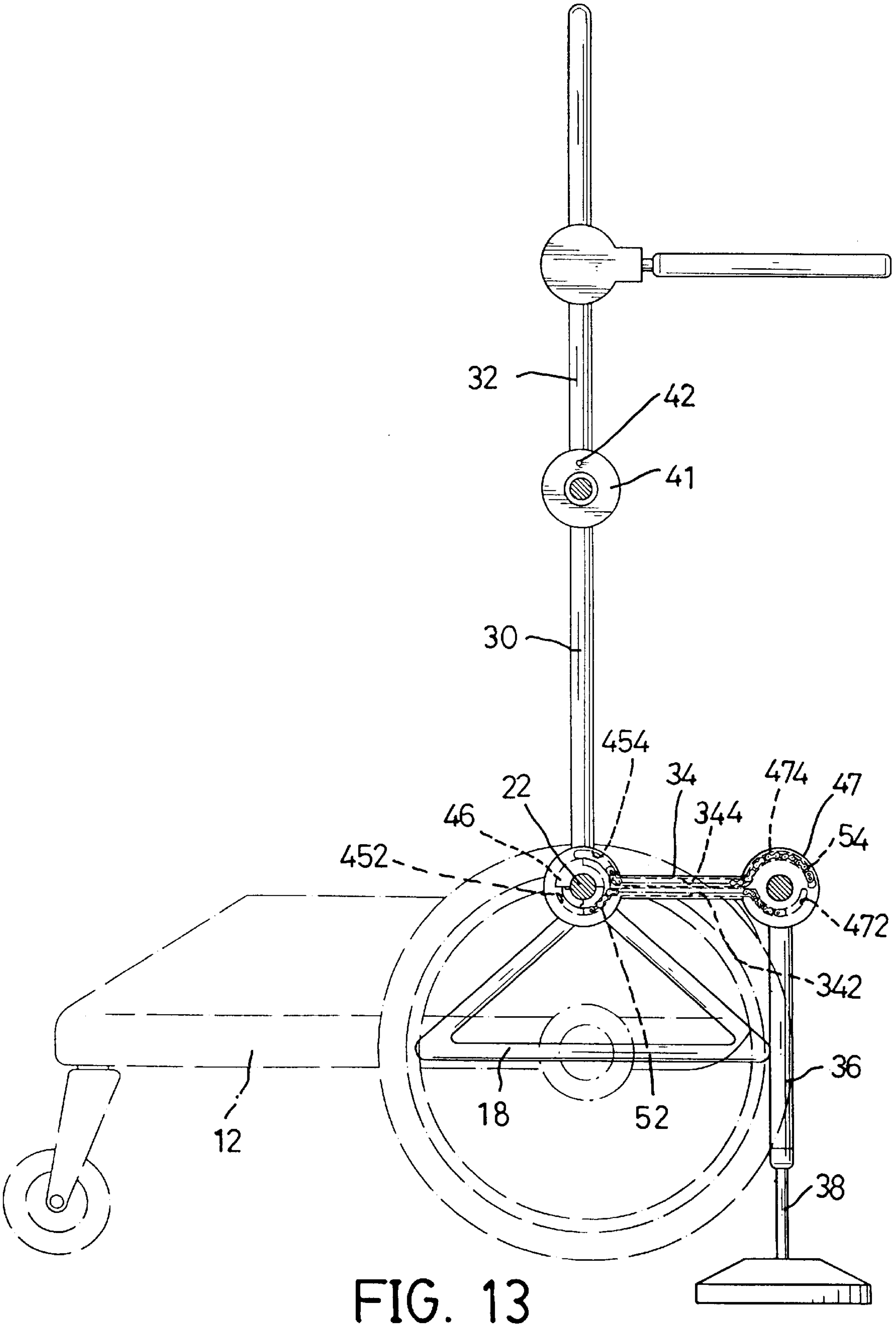
FIG. 13 to the same as FIG. 12 and shows the positions of the second and the third chains.
Figure 14:
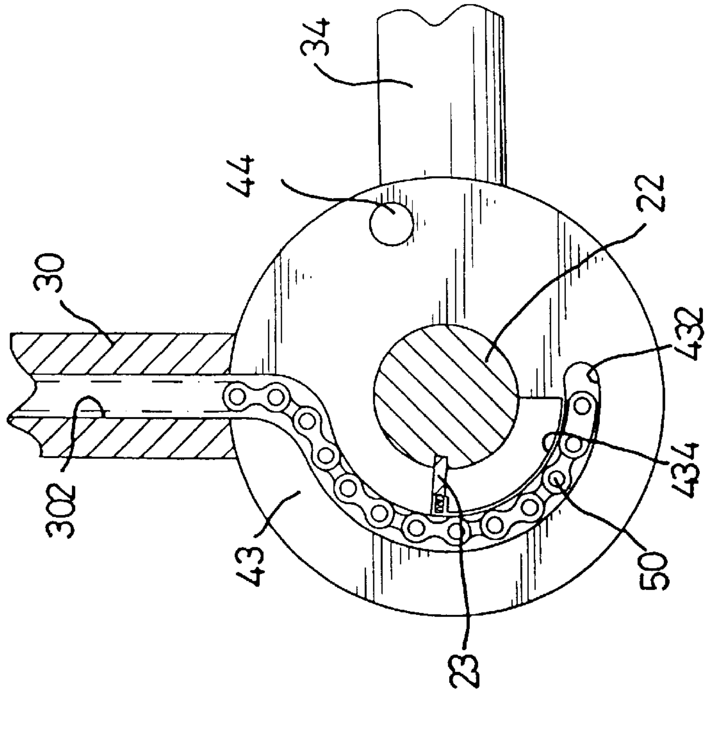
FIG. 14 is a side elevational view, partly in section, of the first rotatable member and the position of the first chain when the backrest is pivoted to the upright position in accordance with the present invention.
Figure 16:
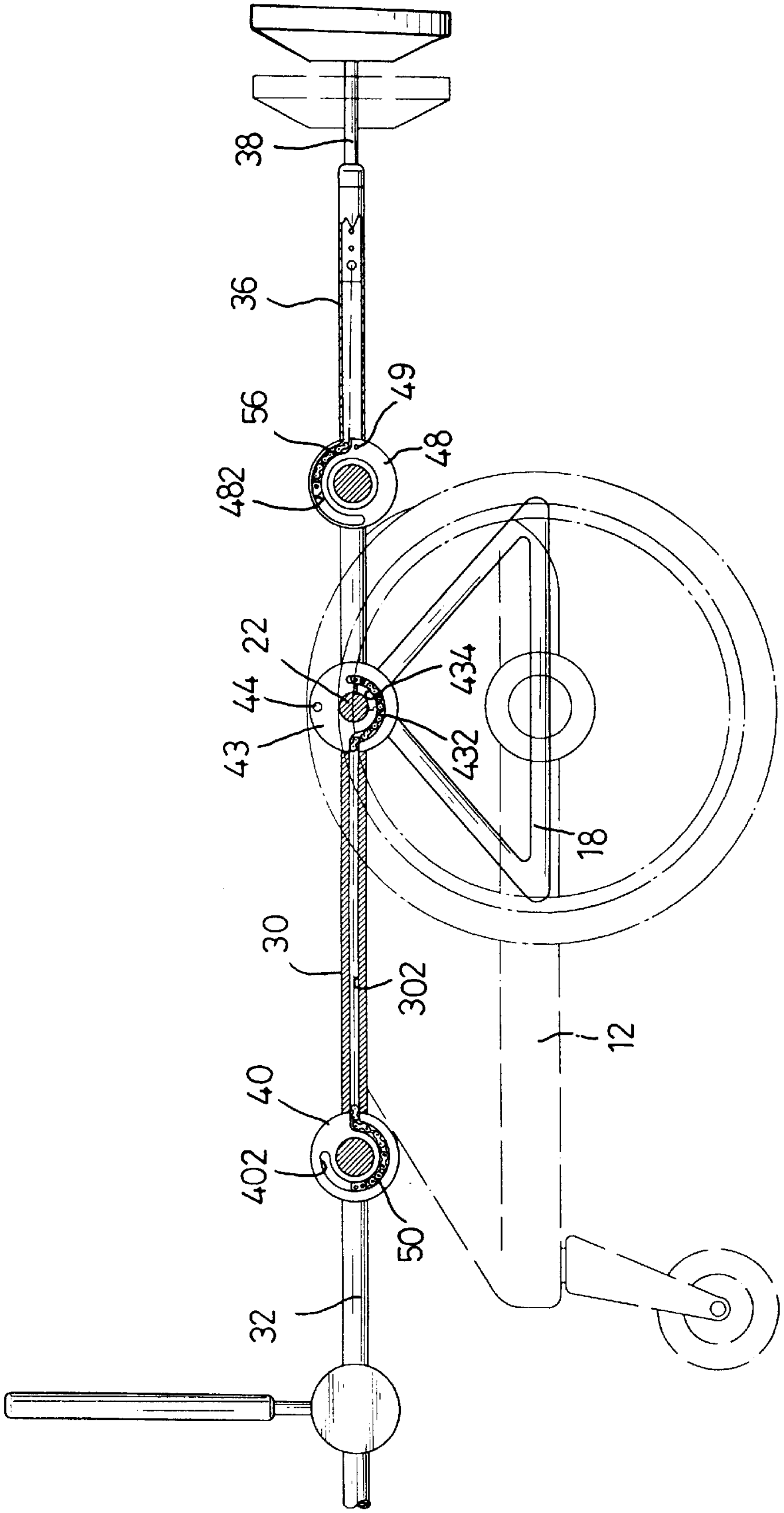
FIG. 16 is a side plan view in partial section of the backrest and the seat pivoted to a horizontal position and the chains in the first connecting tube and the second connecting tube in accordance with the present invention.
Figure 17:
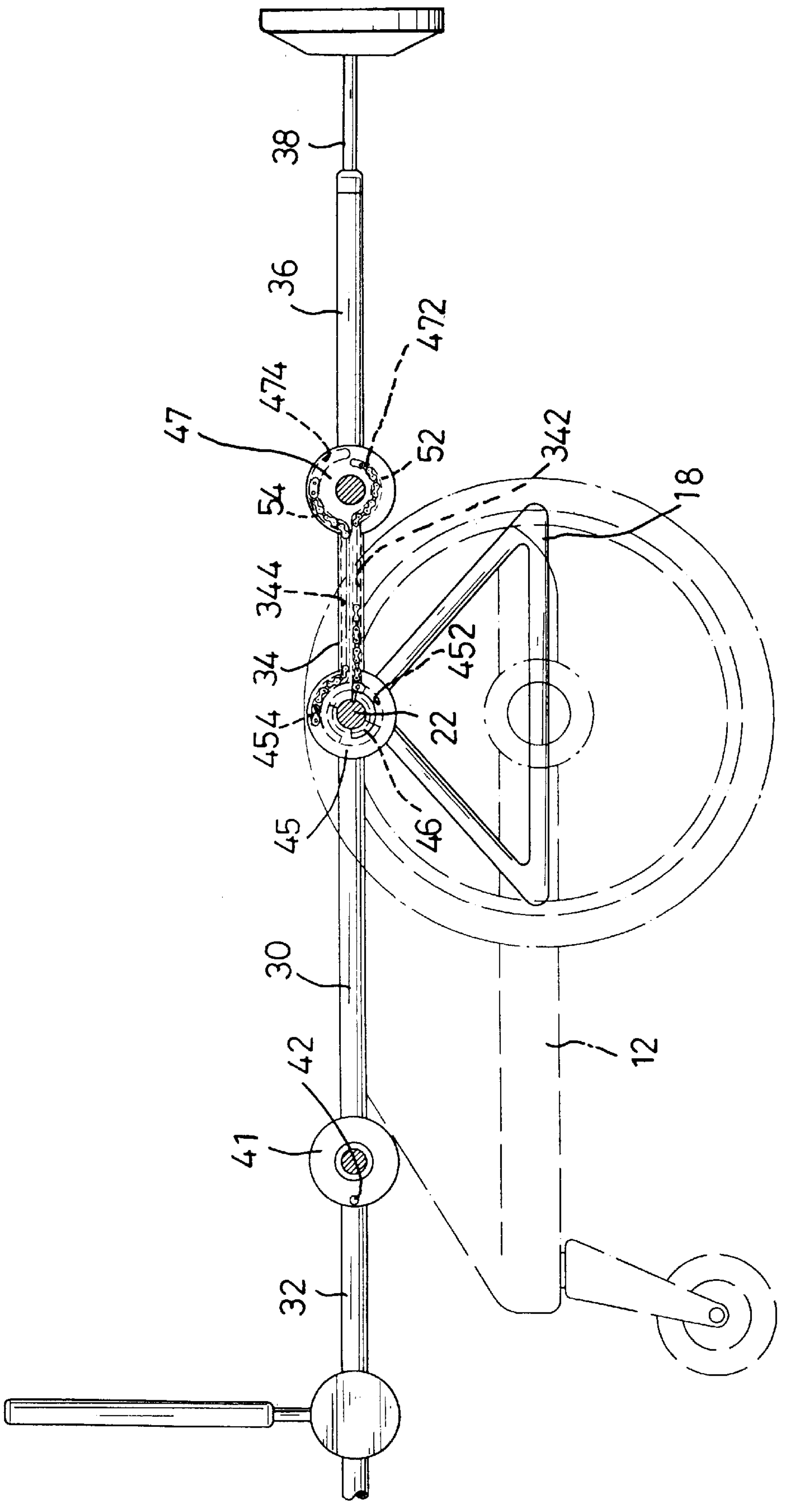
FIG. 17 to the same as FIG. 16 and shows the positions of the second and the third chain.
Figure 18:
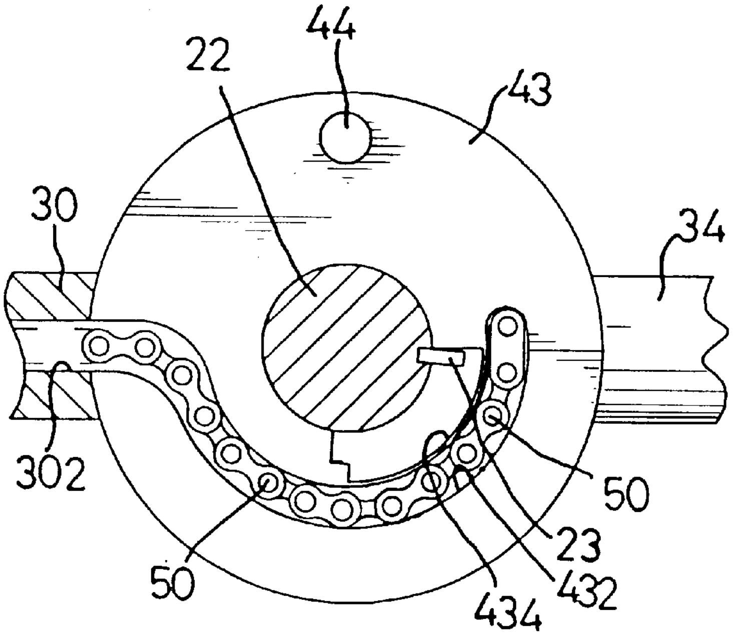
FIG. 18 is a side elevational view, partly in section, of the first rotatable member and the position of the first chain when the backrest is pivoted to the horizontal position in accordance with the present invention.
Figure 19:
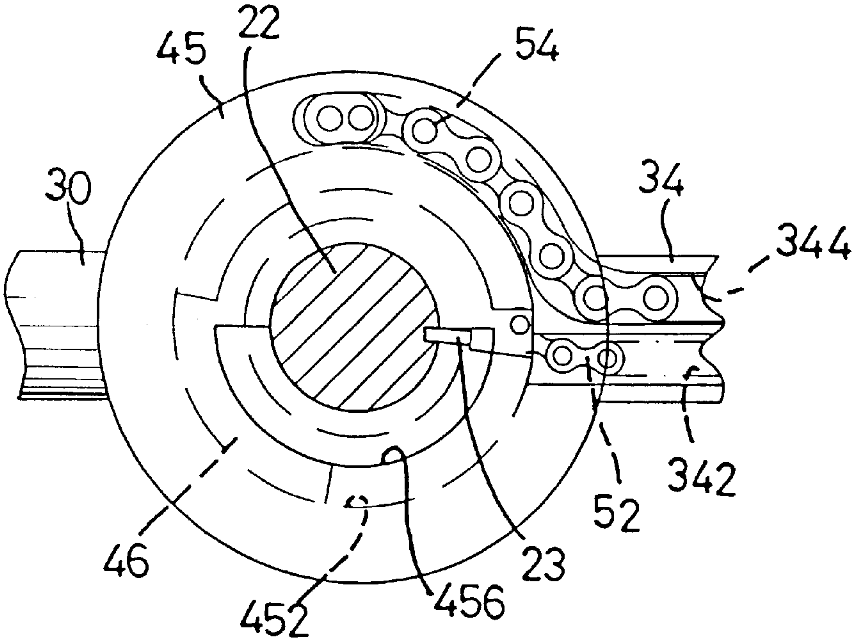
FIG. 19 is a side elevational view, partly in section, of the second fixed member and the position of the second and the third chain when the backrest is pivoted to the horizontal position in accordance with the present invention.

Referring to FIGS. 8 and 9, when a disabled person sitting in the wheelchair wants to stand up, the motor (20) rotates the seat shaft (22) clockwise to rotate the first rotatable member (43) 90 degrees which rotates the first connecting tube (30) to lift the seat (14) around the seat shaft (22) as shown in FIGS. 12 and 13. When the first rotatable member (43) is rotated, the first chain (50) in the second arciform slot (432) reaches the end of the second arciform slot (432) as shown in FIG. 14, which will pull the first chain (50) in the first arciform slot (402) in the first fixed member (40). The first chain (50) in the first arciform slot (402) is connected to the protrusion (42) of the second rotatable member (41), so that the backrest rod (32) connected to the second rotatable member (41) is rotated to make the backrest (16) align with the upright seat (14). Thereby, the movement of the seat (14) and the backrest (16) assists the disable person to stand up.

Figure 15:
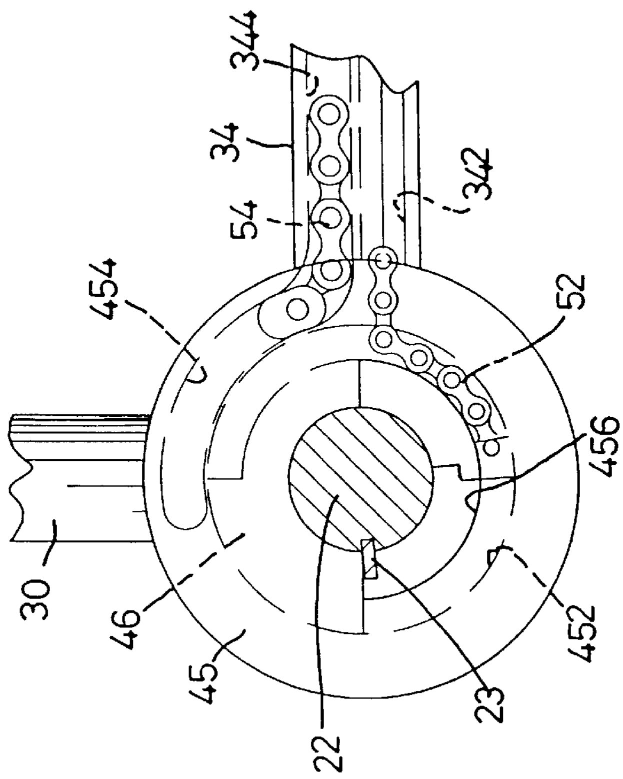
FIG. 15 is a side elevational view, partly in section, of the second fixed member and the position of the second and the third chain when the backrest is pivoted to the upright position in accordance with the present invention.

Referring to FIGS. 12, 13 and 15, when the first rotatable member (43) is rotated, the third rotatable member (48) and the support tube (36) are stopped by the truss (18) so that they cannot rotate clockwise, and because the C-shaped member (46) is disengagably connected to the key (23) so that the key (23) will disengage from the C-shaped member (46).

Referring to FIGS. 12, 13, 14 and 15, when the first rotatable member (43) is rotated, the third chain (54) is moved because the protrusion (44) is fixedly connected to the third chain (54) in the fourth arciform slot (454). It is noted that the third chain (54) is connected to the fourth chain (56) in the seventh arciform slot (482), so that the inner rod (38) connected to the fourth chain (56) is pushed to extend from the support tube (36) and contacts the ground to let the wheelchair (10) be stable and not fall over.

When the motor is rotated counter clockwise, the key (23) together with the first rotatable member (43) connected to the key are rotated so as to return the seat (14) and the backrest (16) to their original positions. If the motor is further rotated 90 degrees counter clockwise, as shown in FIGS. 2, 16, 17, 18 and 19, although the key (23) is disengagably engaged with the first rotatable member (43), the first connecting tube (30) cannot rotate counter clockwise around the seat shaft (22) so that the key (23) is disengaged from the first rotatable member (43) and moves along the first opening (434) while the first rotatable member (43) does not move. Therefore, the C-shaped member (46) in the second fixed member (45) together with the key (23) are rotated in the third arciform slot (452), and further let the second chain (52) move 90 degrees in the third arciform slot (452). Because the second chain (52) is connected to the protrusion (49) on the third rotatable member (48), the third rotatable member (48) is rotated to let the support tube (36) be pivoted to a horizontal position when the second chain (52) is moved.

When the key (23) moves with the C-shaped member (46), the first chain (50) is moved 90 degrees and rotates the second rotatable member (41) because the first chain (50) is connected to the C-shaped member (46) to pivot the backrest (16) to a horizontal position so that the disable person may lie on the wheelchair.

When the motor (20) is rotated clockwise, as shown in FIGS. 9 and 10, the first chain (50) returns to its original position with the movement of the C-shaped member (46), and the backrest (16) is pivoted to the upright position. At the same time, the second chain (52) is moved, and the first rotatable member (48) is rotated to let the support tube (36) and the inner rod (38) return to the upright position.

Figure 7:
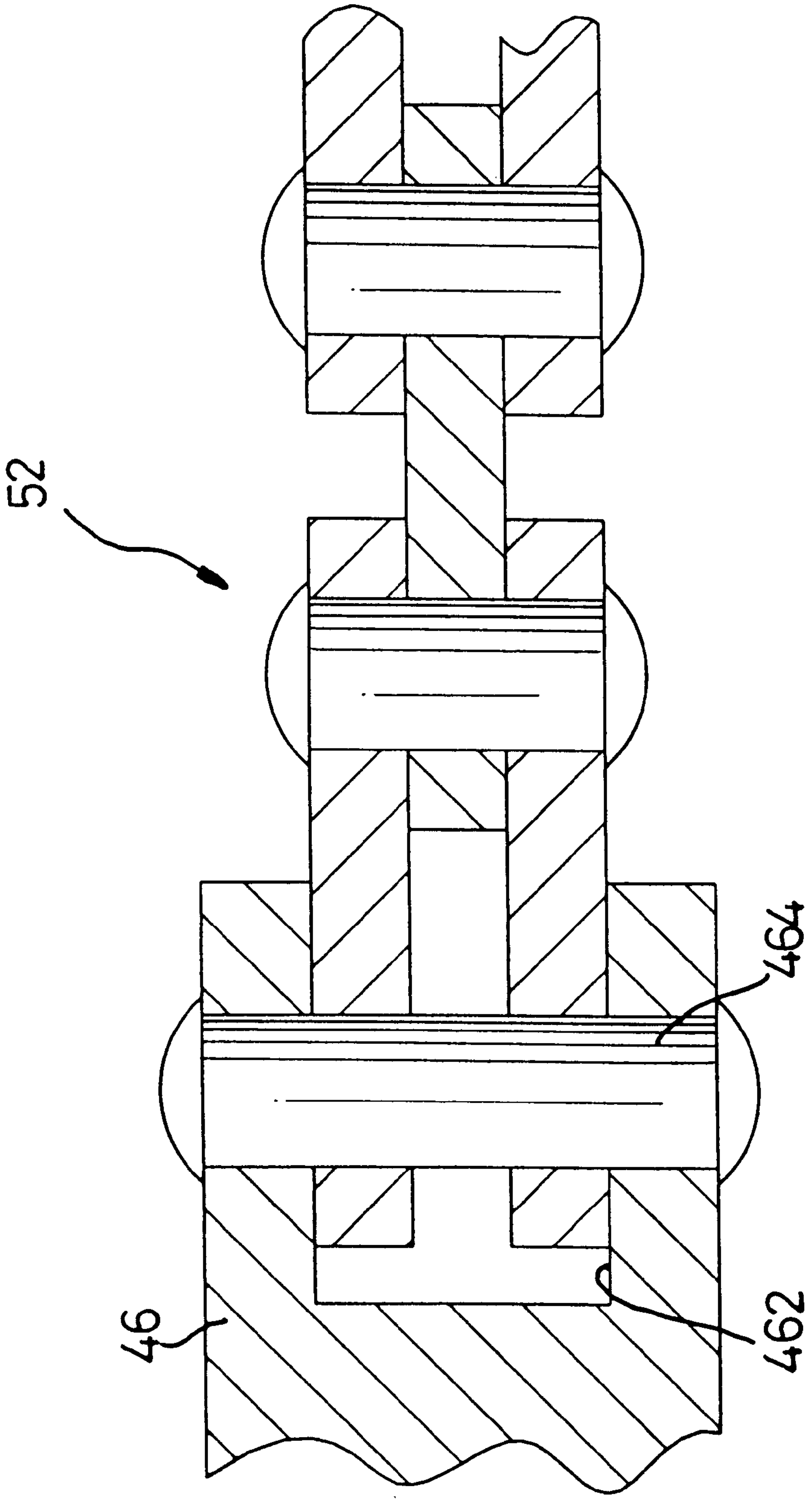
FIG. 7 is a cross-sectional top plan view of the combination of the C-shaped member and the second chain.

Referring to FIG. 7, the C-shaped member (46) has a recess (462) defined therein so as to receive the second chain (52), and a pin (464) extends through the C-shaped member (46) and the second chain (52) so that the second chain (52) is moved together with the C-shaped member (46). The end of the first chain (50) in the second arciform slot (432) of the first rotatable member (43) also may be connected to the C-shaped member (46) in the manner shown in FIG. 7. Similarly, the connection between the third chain (54) and the fourth chain (56) can be made by installing a C-shaped member in the sixth arciform slot (474) and the seventh arciform slot (482) to let the third chain (54) and the fourth chain (56) be connected to the C-shaped member (46).

Although the invention has been explained in relation to its preferred embodiment, it is to be understood that many other possible modifications and variations can be made without departing from the spirit and scope of the invention as hereinafter claimed.

What is claimed is:

1. A wheelchair comprising:

a base (12) and two pairs of wheels respectively connected to two sides of said base (12), a seat (14) connected to said base (12) and a backrest (16) connected to said seat (14), two transmitting systems respectively connected to said seat (14) and said backrest (16), a seat shaft (22) connected to said seat (14) and a backrest shaft (24) connected to said backrest (16), said seat shaft (22) and said backrest shaft (24) respectively connected between said two transmitting systems, a motor (20) connected to said seat shaft (22), each transmitting system comprising:

a first fixed member (40) connected to one of two ends of said backrest shaft (24) and a first arciform slot (402) defined in one of two sides of said first fixed member (40), said first arciform slot (402) extending through a center angle of 270 degrees;

a first rotatable member (43) connected to one of two ends of said seat shaft (22), a key (23) fixedly connected to said seat shaft (22) and disengagably engaged to the first rotatable member (43), a first opening (434) defined through said first rotatable member (43) and extending through a center angle of 90 degrees, a second arciform slot (432) defined in one of two sides of said first rotatable member (43) and extending through a center angle of 180 degrees;

a first connecting tube (30) connected between said first rotatable member (43) and said first fixed member (40), said first connecting tube (30) having a first passage (302) defined longitudinally therein which communicates with said first arciform slot (402) and said second arciform slot (432), a first chain (50) received in said first arciform slot (402), said first passage (302) and said second arciform slot (432);

a second fixed member (45) co-axially connected to said first rotatable member (43) and having a second opening (456) defined therethrough, said second opening (456) extending through a center angle of 180 degrees, a third arciform slot (452) defined in one of two sides of said second fixed member (45), a C-shaped member (46) rotatably received in said third arciform slot (452) so that said seat shaft (22) extending through said second opening (456), said third arciform slot (452) and said first opening (434), said key (23) disengagably engaged with said C-shaped member (46), said first chain (50) having one of two ends thereof fixedly connected to said C-shaped member (46), and a second rotatable member (41) rotatably co-axially mounted to said first fixed member (40), the other end of said first chain (50) in said first arciform slot (402) fixedly connected to said second rotatable member (41).

2. The wheelchair as claimed in claim 1, wherein said second rotatable member (41) has a protrusion (42) extending from one of two sides thereof and said protrusion (42) is fixedly connected to said first chain (50) in said first arciform slot (402).

3. The wheelchair as claimed in claim 1, wherein said second fixed member (45) has a fourth arciform slot (454) defined in one of two sides thereof, said fourth arciform slot (454) extending through a center angle of 90 degrees, a second connecting tube (34) extending from said second fixed member (45) and a third fixed member (47) connected to the distal end of said second connecting tube (34), a fifth arciform slot (472) and a sixth arciform slot (474) respectively defined in one of two sides of said third fixed member (47), both of said fifth arciform slot (472) and said sixth arciform slot (474) extend through a center angle of 90 degrees, said second connecting tube (34) having a second passage (342) and a third passage (344) defined therethrough, said second passage (342) communicating with said fifth arciform slot (472) and said third arciform slot (452), said third passage (344) communicating with said fourth arciform slot (454) and said sixth arciform slot (474), a second chain (52) received in said third arciform slot (452), said second passage (342) and said fifth arciform slot (472), said second chain (52) having one end engaged with said C-shaped member (46), said third chain (54) received in said fourth arciform slot (454), said third passage (344) and said sixth arciform slot (474), one end of said third chain (54) attached to said first rotatable member (43), a third rotatable member (48) mounted to said third fixed member (47) with a knee shaft (26) rotatably extending through said third rotatable member (48) and fixedly connected to said third fixed member (47), said second chain (52) having one end thereof in said fifth arciform slot (472) fixedly connectedly connected to said third rotatable member (48), a support tube (36) extending from said third rotatable member (48).

4. The wheelchair as claimed in claim 3, wherein said first rotatable member (43) has a protrusion (44) extending from one of two sides thereof, and said protrusion (44) is fixedly connected to said third chain (54) in said fourth arciform slot (454).

5. The wheelchair as claimed in claim 3, wherein said third rotatable member (48) has a protrusion (49) extending from one of two sides thereof and said protrusion (49) is fixedly connected to said second chain (52) in said fifth arciform slot (472).

6. The wheelchair as claimed in claim 3, wherein said third rotatable member (48) has a seventh arciform slot (482) defined in one of two sides thereof and said seventh arciform slot (482) extend through a center angle of 180 degrees, a fourth chain (56) received in said seventh arciform slot (482) and said support tube (36) having an inner rod (38) movably received therein, one of two ends of said fourth chain (56) is fixedly connected to said third chain (54) in said sixth arciform slot (474) and the other end of said fourth chain (56) fixedly connected to said inner rod (38).

7. The wheelchair as claimed in claim 3 further comprising a truss (18) located below said base (12) and contacting the support tube (36).

* * * * *